Sept. 15, 1942.  J. MORKOSKI  2,296,175
SPRING RELEASE DEVICE
Filed March 26, 1940   3 Sheets-Sheet 2

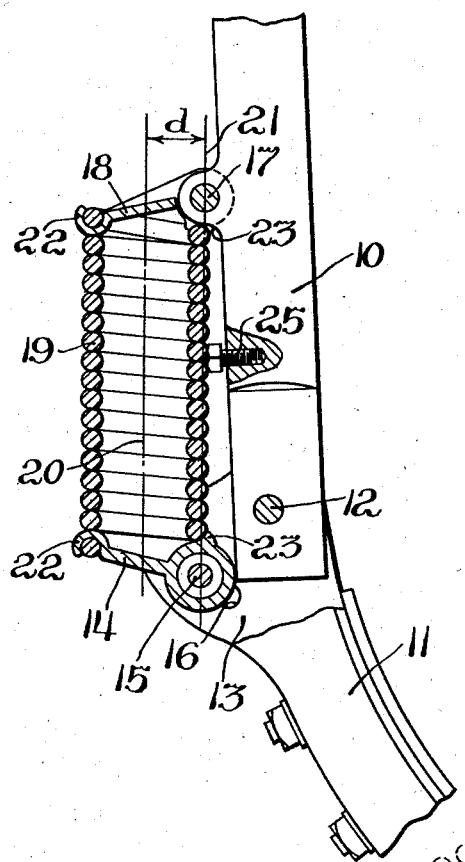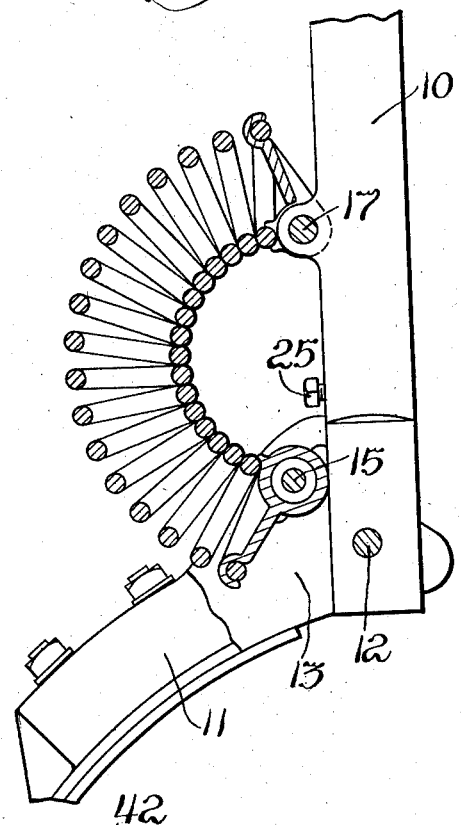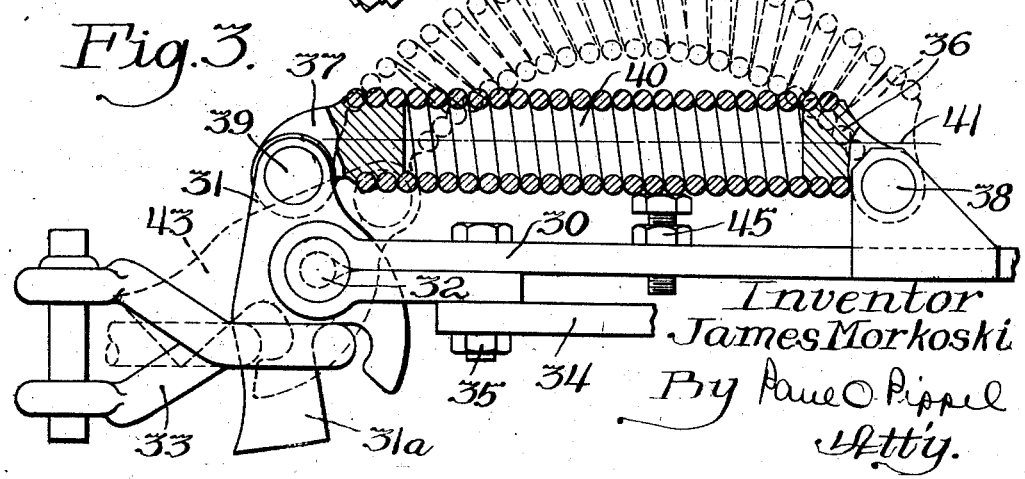

Inventor
James Morkoski
By Paul O Pippel
Atty.

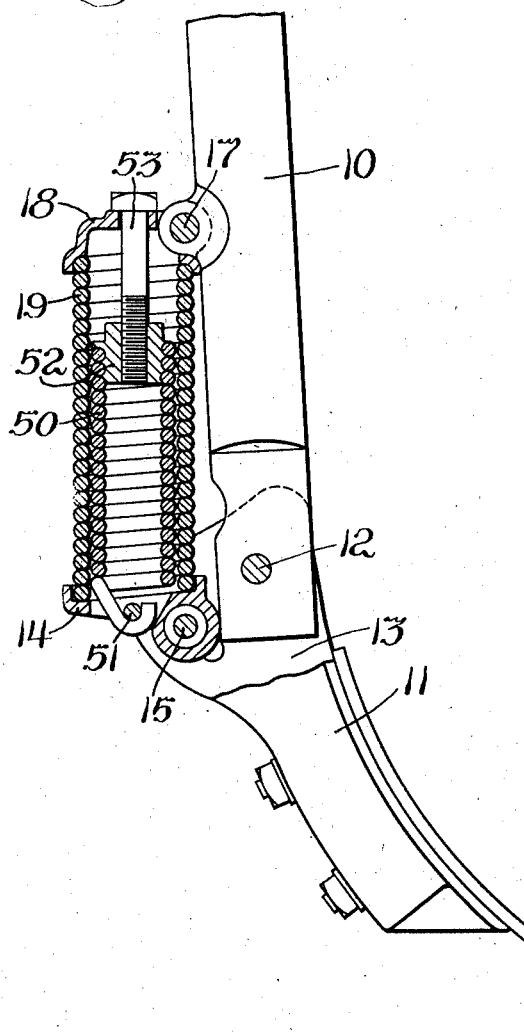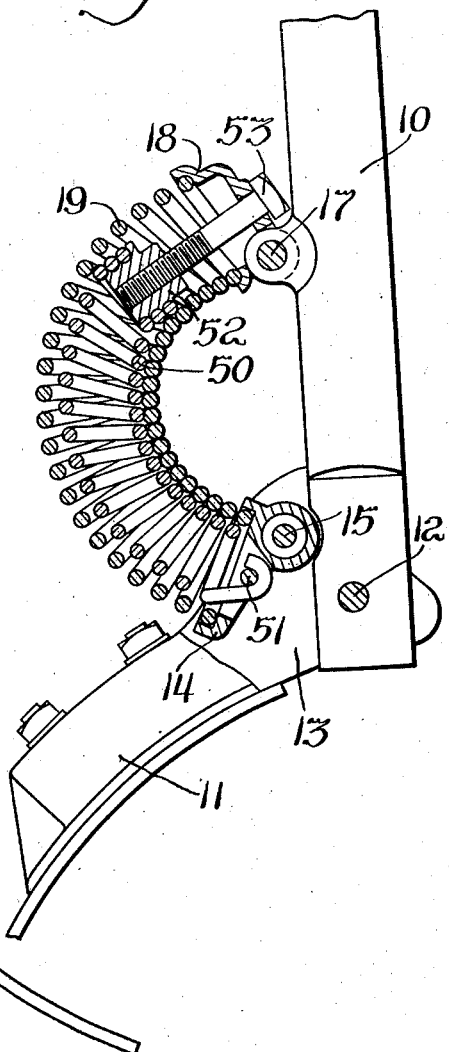

Patented Sept. 15, 1942

2,296,175

UNITED STATES PATENT OFFICE 2,296,175

SPRING RELEASE DEVICE

James Morkoski, Canton, Ill., assignor to International Harvester Company, a corporation of New Jersey Application March 26, 1940, Serial No. 326,065

9 Claims. (Cl. 97—184)

This invention relates to spring release devices, and more particularly to such devices for use with agricultural implements.

It is the object of this invention to provide a spring release device which is of simple construction, cheap to manufacture, and efficient in operation.

According to the present invention, there has been provided an arrangement for the connection of a buckling spring betwen two relatively pivotal or movable elements, on one of which considerable force tending to pivot the same relative to each other may be applied, and wherein after a predetermined force has been applied, an immediate distortion or buckling of the spring device will occur to permit the two relatively pivotal members to release or pivot relative to each other. Such an adaptation of a spring has particular use in connection with cultivator shovel trip mechanisms or with releasable devices located between a pull behind implement and a tractor, wherein, upon striking an obstruction which might ordinarily cause injury, the device releases in the case of cultivator shovels to permit the same to pass over the obstruction, or, in the case of the trail-behind implement, to permit the same to disconnect from the tractor.

For a better understanding of the invention, reference may be had to the folowing detail description taken in connection with the accompanying drawings, in which:

Figures 1 and 2 show views in elevation of a portion of a standard member and of a cultivator shovel with the spring arrangement disposed between them, the former figure showing the shovel in its normaly untripped position, while the latter figure shows the shovel in a tripped position;

Figure 3 is a view in elevation of a hitch arrangement for a tractor utilizing the principles set forth by this invention;

Figure 4:
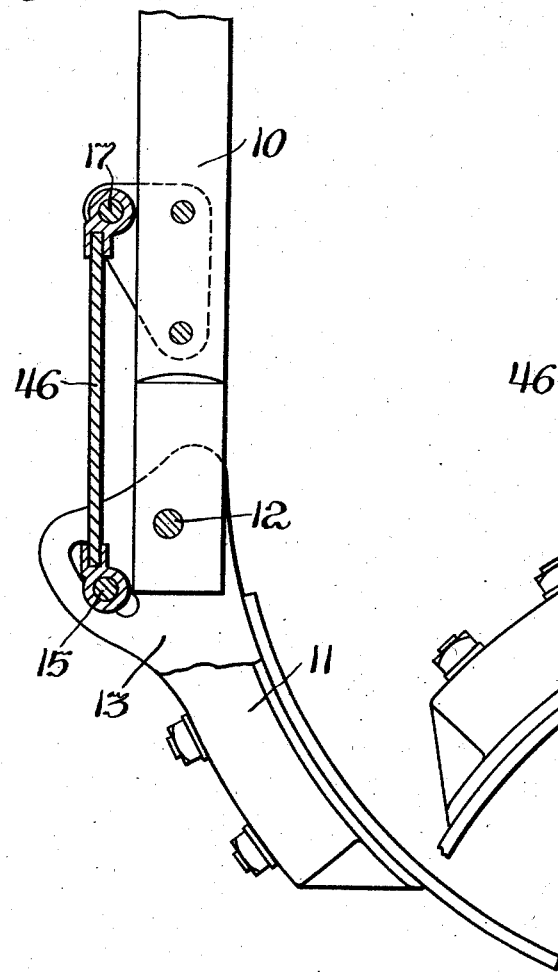
Figure 5:
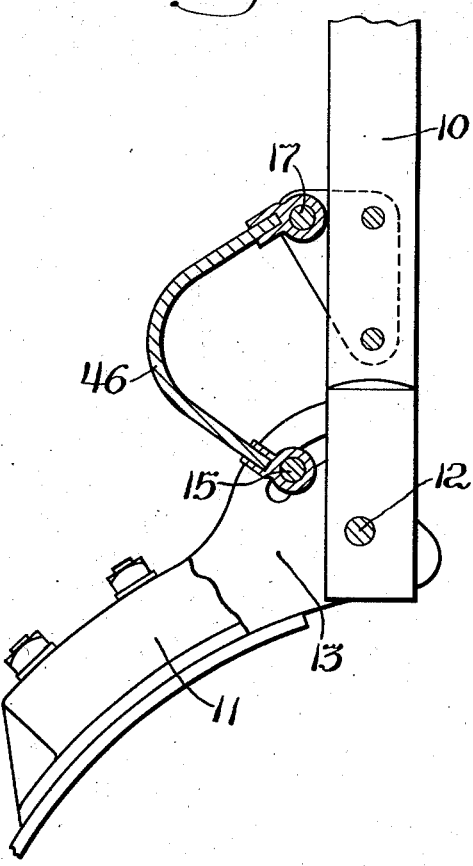

Figures 4 and 5 are similar to Figures 1 and 2, but show the use of a modified form of spring; and, Figures 6 and 7 also are similar views to Figures 1 and 2, respectively, but show still further a modified form wherein two springs are used, one within the other, and the former being adjustable to change the effect of the latter.

Referring now to Figures 1 and 2 particularly, there is shown a cultivator standard element 10 to which is pivotally connected a shovel element 11, as indicated at 12. This shovel element 11 is of the usual form and includes a bifurcated portion 13, shown in part, between which may be pivoted a pivot element 14 forming a part of the present invention. This pivot element may pivot about a bearing axis 15 which can be positioned at any location within the bifurcated portion 13 of the shovel element 11, as indicated by the same being positioned along a slot 16 formed in the same.

Connected to the standard element 10 and pivoted on an axis 17 is an element 18 similar to the pivotal element 14 pivoted on the shovel trip element 11, but presenting an opposite face for the reception of a coil or buckling spring 19. The pivot axes 15 and 17 are parallel with the axis 12 to permit pivoting movement of the element in the same or vertical plane. It should be noted that the central axis 20 of the coil spring 19 is offset or removed by a distance $d$ from a line 21 drawn betwen and perpendicular to the pivot points 15 and 17 of the respective pivot elements 14 and 18. An offset of some amount is practically necessary for operation of the arrangement.

It will be noted that the elements 14 and 18 are so designed as to receive the ends of the spring 19, as indicated at 22, so that, upon deflection of the spring device, it will not be freed from the pivoted elements, the spring being threaded over a portion of the element. The spring 19 may also contact with the pivotal elements, as indicated at 23, to retain that side of the spring in compression. By these connections, the spring 19 may be amply withheld between the pivotal elements 14 and 18 regardless of the amount of deflection of the same.

By virtue of the center of the spring 19 being offset from the line 20, it is natural that, when ample force is applied to the shovel element 11, the spring 19 will flex or deflect outwardly, as shown particularly in Figure 2. The force applied to the shovel 11 acts through the pivot axis 15 and will tend to pivot the elements 14 and 18, and, upon the resistance of the spring to distortions being overcome, it will buckle and yield suddenly to permit passage of the obstruction met with by the shovel element 11. When the obstruction has been passed, the spring will tend to reshape itself and take the original position shown in Figure 1. It should thus be noted that the action of the spring has in effect the action of a toggle, and thus the spring might be well identified as a toggle spring. The break is sudden and the deflection is the greatest midway between the ends thereof.

In order to provide means for varying the amount of pressure necessary to trip the shovel, or the effectiveness to resist tripping, there is provided an adjustable stop 25 threaded into the standard element 10. By adjustment of this stop 25, the spring device may be prevented from completely returning to its normally straightened position to thereby weaken its effect and to lessen the amount of force required to trip it.

Referring now to Figure 3, there is shown a releasable hitch device for tractors to which trail-behind implements may be connected, comprising in general a supporting element 30 corresponding to the standard element 10 of Figures 1 and 2 and to which is pivoted a latch element 31 at 32. This latch element 31 extends rearwardly from the tractor and has a portion 31a for connection with a hitch element 33 of any trail-behind implement. The supporting element 31 may be attached to a tractor draw-bar 34 by means of a bolt 35. Like in the structures shown in Figures 1 and 2, the relatively pivotal elements 30 and 31 may have in turn, respectively pivoted thereto, spring pivotal elements 36 and 37. The pivotal element 36 is pivoted at 38 to the supporting element 30, while the pivotal element 37 is pivoted at 39 to the latch element 31. These pivotal elements 36 and 37 may be of slightly different construction from the pivotal elements 14 and 18 of Figures 1 and 2, but in the main they are generally of such type as to retain the spring in both its original and deflected shape. Briefly, these pivotal elements 36 and 37 may have threaded portions onto which the ends of a toggle spring 40 may be respectively threaded.

It should be noted that in this construction, as in the construction shown in Figures 1 and 2, that an axis 41 through the center of the spring 40 is similarly offset with respect to the pivots 38 and 39 of the arrangement. While in both of these constructions already described this distance is noted to be of some consequence, it has been found upon actual experience that the distance need only be very slight, since the inner side of the spring under load compresses slightly enough to effect buckling of the spring.

In the operation of this device shown in Figure 3, it will be apparent that when an implement is restrained from forward movement due to an obstruction in its path, a great force will be applied through the hitch element 33 to the pivoted latch element 31. If this force reaches an amount to overload the spring 40, the same will yield to a position shown in dotted lines at 42 thereby permitting pivoting of the latch element 31 about the pivot point 32 to a position also shown in dotted at 43 to permit the hitch element 33 to slide out of its connection with the latch element 31. When the hitch element 33 of the implement has been freed of the device, the spring 42 will return to its original shape and thereby automatically reset the device. This hitch device may likewise have an adjustable stop to vary the amount of force required to trip the same. Such an adjustable stop is shown at 45.

Referring now to the arrangements shown in Figures 4 and 5, it will be seen that instead of using a coil spring, a flat spring 46 is used which may fold back upon itself when a predetermined pressure has acted against the axis 15, all of which is dependent upon the strength of the spring and of its connection with respect to the standard element 10 and shovel element 11. The spring element 46 should be of heavy spring material but only sufficient to permit sudden relief of the shovel element 11 from an obstruction.

Referring now to Figures 6 and 7, it will be noted that there has been provided an arrangement wherein a second or auxiliary spring 50 may be used within the single spring 19 to give added strength to the same. Also, there has been provided associated with this spring, means whereby there may be an adjustment of the device to increase or decrease the force at which the shovel trip 11 will break, which means is accessible for adjustment through the pivotal element 18. This second spring 50 may be attached as at 51 to the pivotal element 14 while the other end of the spring element 50 may have threaded therein a coupling member 52 to which is threaded to effect the adjustment by an adjusting bolt 53 which extends through the upper pivotal element 18 to be readily accessible. By adjusting the bolt 53 it will be apparent that the spring 50 may be elongated to give increased force or effect to the device or it may be returned to its compressed position where it will have a minimum effect. It will be noted that the spring 50 also serves as the means for holding the outer spring seated within the pivot members making the portion 22 of the forms shown in Figures 1, 2, and 3 unnecessary. This aids in the assembling of the mechanism. Where the shovel is adapted to work in very heavy soil, this form of the invention may be used to greatest advantage.

It should now be apparent that there has been provided a very simple and efficient spring release device for use with agricultural implements. While the device has only been shown in connection with two possible uses of the same, it should be understood that the device may readily be adapted for use with other arrangements where it is desired to have sudden release of parts upon the arrangement striking an obstruction.

While various changes may be made by way of adapting the spring device for other uses, or for the present use, it is to be understood that such changes shall be within the spirit and scope of the present invention as defined in the appended claims.

What is claimed is:

1. In an agricultural implement, a tool-supporting element, a working tool element, the two elements adapted to pivot with respect to each other and adapted to have force applied for so pivoting the same, biasing means for maintaining the elements in their normal position and for normally resisting the force being applied to the same, said biasing means including a buckling spring and two other elements for pivotally connecting the ends of the spring respectively between said first two mentioned elements, each of the pivotally connected elements being arranged to pivot about an axis parallel to the pivot axis between the first two mentioned elements, both of the pivotally connected elements being arranged and shaped to retain said spring so that the center axis thereof is offset with respect to a line extending between and perpendicular to the axes of the pivot elements, whereby said spring may be caused suddenly to buckle upon sufficient force being applied to pivot the first mentioned elements with respect to each other.

2. In shovel trip mechanism, a standard element, a shovel element pivoted to the standard element, spring means for maintaining the shovel element in its normal plowing position, including a buckling spring and pivot elements for connecting the spring to the standard and shovel elements, one carried respectively by the standard member and by the shovel element on a pivot axis substantially parallel with the pivot axis between the shovel element and the standard member, said pivot elements being arranged and shaped to retain the spring so that the center axis thereof is offset with respect to a line extending between and perpendicular to the axes of the pivot elements, whereby said spring may be caused to suddenly buckle upon the shovel element striking an obstruction.

3. In a shovel trip mechanism, a standard element, a shovel element pivoted to the standard element, biasing means for maintaining the shovel element in its normal plowing position, including a buckling spring and pivot elements for connecting the spring to the standard and shovel elements, one carried respectively by the standard element and by the shovel element on pivot axes substantially parallel with the pivot axis between the shovel element and the standard member, said pivot elements being arranged and shaped to retain the spring so that the center axis thereof is offset with respect to a line extending between and perpendicular to the axes of the pivot elements, and adjustable means associated with the biasing means to vary the effectiveness of the same to resist tripping of the shovel element.

4. In shovel trip mechanism, a standard element, a shovel element pivoted to the standard member, biasing spring means for maintaining the shovel element in its normal plowing position including a buckling spring and pivot elements for connecting the spring to the standard and shovel elements, one carried respectively by the stanadard member and by the shovel element on pivot axes substantially parallel with the pivot axis between the shovel element and the standard member, said pivot elements being arranged and shaped to retain the spring so that the center axis thereof is offset with respect to a line extending between and perpendicularly to the pivot axes of the pivot elements, and an adjustable stop means carried by the standard element to engage one side of the spring to prevent complete return of the same to its normal position and thereby to vary the effectiveness of the same to resist tripping of the shovel element.

5. In an agricultural implement, a tool-supporting element, a working tool element, the two elements movable with respect to each other, a pair of buckling springs, one positioned within the other, and means for attaching said springs between the two elements normally to resist relative movement therebetween but to buckle suddenly upon a predetermined force being applied to move one of the elements with respect to the other.

6. In a shovel trip mechanism, a standard element and shovel element pivotally connected thereto, a pair of buckling springs, one positioned within the other, means for attaching said springs between the two elements normally to resist relative movement therebetween but to permit sudden buckling upon abnormal force being applied, said attaching means including means for adjusting the spring positioned within the other to vary the effectiveness of both springs to resist the force being applied to pivot the elements with respect to each other.

7. In a shovel trip mechanism, a standard element and a shovel element pivotally connected with respect to each other, biasing means for maintaining the shovel element in its normal position including a pair of buckling springs, one positioned within the other, pivot members for connecting the ends of the springs respectively to the standard and shovel elements, the arrangement being such as to permit buckling of the springs upon abnormal force being applied to the shovel element, and adjustable means connected between one end of the inner spring and its respective pivot member to vary the combined effectiveness of the springs to resist tripping of the shovel element.

8. In an agricultural implement, a tool-supporting element, a working-tool element, the two elements movable with respect to each other, biasing means for normally preventing relative movement of said elements and including a pair of buckling springs, one positioned within the other, pivot members for connecting the ends of the springs respectively to said elements, the arrangement being such that the spring positioned within the other spring serves to retain the other spring between the two pivot members, whereupon the springs may be retained in their positions to permit temporary buckling of the same upon abnormal load being applied to move one element with respect to the other element.

9. In an agricultural implement, a tool-supporting element, a working tool element, the two elements movable with respect to each other, biasing means for normally preventing relative movement of said elements and including a pair of buckling springs, one positioned within the other, pivot members for connecting the ends of the springs respectively to said elements, the arrangement being such that the spring positioned within the other spring serves to retain the other spring between the two pivot members, and adjustable means between one end of the spring within the other and its respective pivot member to vary the combined effect of the springs.

JAMES MORKOSKI.